(12) United States Patent
Grover et al.

(10) Patent No.: US 10,222,870 B2
(45) Date of Patent: Mar. 5, 2019

(54) REMINDER DEVICE WEARABLE BY A USER

(71) Applicant: Santa Clara University, Santa Clara, CA (US)

(72) Inventors: Radhika Grover, San Jose, CA (US); Jocelyn Tan, San Jose, CA (US)

(73) Assignee: Santa Clara University, Santa Clara, CA (US)

( * ) Notice: Subject to any disclaimer, the term of this patent is extended or adjusted under 35 U.S.C. 154(b) by 24 days.

(21) Appl. No.: 15/092,212

(22) Filed: Apr. 6, 2016

(65) Prior Publication Data

US 2016/0299572 A1 Oct. 13, 2016

Related U.S. Application Data

(60) Provisional application No. 62/144,098, filed on Apr. 7, 2015.

(51) Int. Cl.
| | |
|---|---|
| *G06F 1/16* | (2006.01) |
| *G06F 3/01* | (2006.01) |
| *G06F 3/16* | (2006.01) |
| *G09B 21/00* | (2006.01) |
| *G09B 19/00* | (2006.01) |

(52) U.S. Cl.
CPC .............. *G06F 3/017* (2013.01); *G06F 1/163* (2013.01); *G06F 1/1694* (2013.01); *G06F 3/167* (2013.01); *G09B 21/008* (2013.01); *G09B 21/009* (2013.01)

(58) Field of Classification Search
None
See application file for complete search history.

(56) References Cited

U.S. PATENT DOCUMENTS

| | | | |
|---|---|---|---|
| 8,656,279 B2 | 2/2014 | Haug | |
| 8,717,856 B2 | 5/2014 | Lin | |
| 8,782,566 B2 | 7/2014 | Sarkar | |
| 9,201,523 B1 * | 12/2015 | Hwang | G06F 3/03545 |
| 9,223,494 B1 * | 12/2015 | DeSalvo | G06F 3/0488 |
| 2003/0224762 A1 | 12/2003 | Lau | |
| 2005/0110778 A1 * | 5/2005 | Ben Ayed | G06F 3/03545 |
| | | | 345/179 |

(Continued)

FOREIGN PATENT DOCUMENTS

| | | |
|---|---|---|
| EP | 2558909 | 2/2013 |
| EP | 2704070 | 3/2014 |
| WO | WO2011133628 | 10/2011 |

OTHER PUBLICATIONS

Wang, Jeen-Shing; Fang-Chen Chuang, "An Accelerometer-Based Digital Pen With a Trajectory Recognition Algorithm for Handwritten Digit and Gesture Recognition," Industrial Electronics, IEEE Transactions on , vol. 59, No. 7, pp. 2998,3007, Jul. 2012.

*Primary Examiner* — Stephen T. Reed
(74) *Attorney, Agent, or Firm* — Lumen Patent Firm (57) ABSTRACT

A wearable reminder device is provided using two different types of gestures obtained from two different types of sensors. The device outputs audio to a user but does not have a display, a keypad, or speech recognition software, therewith significantly reducing size, storage requirements and power consumption. Hence the device is suitable for use by the blind, persons with a speech impediment, visually impaired persons, and others who are unable to read small fonts.

3 Claims, 7 Drawing Sheets

(56) References Cited

U.S. PATENT DOCUMENTS

| | | |
|---|---|---|
| 2006/0217967 A1 | 9/2006 | Goertzen |
| 2009/0140855 A1 | 6/2009 | Shemesh |
| 2012/0265535 A1 | 10/2012 | Bryant-Rich |
| 2013/0207936 A1* | 8/2013 | Theimer ............... G06F 3/0488 345/175 |
| 2013/0339026 A1 | 12/2013 | Lee |
| 2014/0219066 A1 | 8/2014 | Sadilek |
| 2016/0328029 A1* | 11/2016 | March ................... G06F 3/0346 |

* cited by examiner

REMINDER DEVICE WEARABLE BY A USER

CROSS-REFERENCE TO RELATED APPLICATIONS

This application claims priority from U.S. Provisional Patent Application 62/144,098 filed Apr. 7, 2015, which is incorporated herein by reference.

FIELD OF THE INVENTION

This invention relates to wearable reminder devices.

BACKGROUND OF THE INVENTION

Alzheimer's an irreversible, progressive brain disease affects 5.1 million Americans. Alzheimer's patients experience a gradual decline in memory and thinking that can make it difficult for them to complete familiar tasks. To overcome this challenge, a reminder device, which can be programmed remotely by a caregiver, could prompt those with Alzheimer's with timely notifications. Likewise, autism affects 1 in 68 children in the US, and about 1% of the world's population has autism. By using a reminder device, a broad spectrum of autism patients can be assisted through the aforementioned technology.

It has been shown that autistic students respond to commands better when they are announced in the same tone of voice. As a result, instead of using live prompting, which contains voice inflections, students who utilize our device will be able to depend on a more tone-regulated notification system. Not only will the technology of this invention diminish the time and energy spent by instructors to relay repeated information to their students, but it will also elicit a better response from its constituents.

Although reminder devices exist in the market, the ability to customize such devices is limited. Most clock applications can be set to specific times to provide reminders; however, these reminders mostly come in the form of buzzers or non-customizable, non-verbal commands. For clocks that have a voice-controlled reminder feature, most are expensive and have limited customizability. There are software applications available on mobile devices that provide a reminder functionality; however, the high cost of the mobile device or the inability to use a mobile device makes these applications inaccessible to many categories of individuals including e.g. the autistic, blind, and elderly.

For setting calendar-based alarms, existing reminder devices either use displays or use speech recognition software. Display-based devices can be touchscreen or keypad based. The problem with these devices is that they need to be large so that the user can read the screen or use the keypad with ease. In addition, these devices are not suitable for people who are blind or visually impaired. Furthermore, the display itself can have significant power consumption.

Other types of reminder devices use speech recognition for extracting the time and contextual information from the commands. Speech recognition requires a large amount of memory and computational power, which increases the size and power consumption of the device. In addition, noisy environments may make it difficult to perform recognize commands accurately.

The present invention advances the art by providing a reminder device using gestures without the use of displays, keypads or speech recognition software, therewith significantly reducing size, storage requirements and power consumption.

SUMMARY OF THE INVENTION

The present invention provides a reminder device that is a low power, cost-effective wearable device that provides time-based audio reminders. It has a small size and can be clipped near the shoulder or worn elsewhere. Unlike other devices described in art, this device does not have a keypad or display for user input nor does it perform speech recognition. The device is programmed and used solely through gestures. This provides the added advantage of a very small size, which is important for wearable devices. Hence the device is suitable for use by the blind, persons with a speech impediment, visually impaired persons, and others who are unable to read small fonts.

The device can be programmed in one of two ways. In the first method, the device is programmed through contactless operations such as moving the hand in front of the device in different directions (UP, DOWN, LEFT, RIGHT, NEAR, FAR) that are detected by a gesture sensor on the device. The device produces audio output that guides the user through the process of programming and using the device. For convenience, the device prompts the user on the appropriate gesture for the next command, thereby relieving the user from having to learn a large number of gestures for programming the device. In the second method, the user traces shapes (e.g. letters or numbers) while holding a mobile device with inertial sensors (such as a digital pen or wand), and the motion trajectory information of the number or shape is transmitted wirelessly to the device for further processing and shape recognition. The device is programmed to automatically process data from either the digital pen or the gesture sensor depending on whichever one is used by the user. This dual programming option allows the user to select the human-computer interaction (HCI) technique that is more convenient.

The device can automatically connect to a wireless data network and perform various operations such as synchronization with a time server, creating a graphical user interface displaying calendar information to a user on a computer or mobile device, and storing compliance information on a local machine or remote server.

In one embodiment, the reminder device is a wearable by a user. The device has a gesture sensor for detecting a first type of gestures. The gesture sensor is capable of recognizing gestures made by the user's hand. The device also has one or more inertial sensors for detecting a second type of gestures (e.g. a digital pen or wand, accelerometer or gyroscope). Each of the inertial sensors is capable of recognizing gestures made by the user handling the inertial sensor. An inertial sensor is wirelessly connected with the device.

The device further has a gesture recognition module executable by a processor on the device. The gesture recognition module is configured to receive the sensor data for the first and second types of gestures. The gesture recognition module is programmed to recognize:
  (i) among the first type of gestures, at least three distinct sets of hand gestures with each distinct set of hand gestures having defined at least two distinct type of hand motions, and
  (ii) among the second type of gestures, letters and numbers.

An example of (i) is UP/DOWN, LEFT/RIGHT and NEAR/FAR defining 3 sets with 2 types per set.

The device further has a state machine executable by the same processor or a different processor on the device. The state machine is configured to have a plurality of states programmed to receive the recognized gestures by the gesture recognition module. The state machine changes its state based on the recognized gestures. Depending on the state machine's current state audio data is output to the user (j) as a result of the user's first and second type of gestures communicated by the gesture and inertial sensors or (jj) as a result of a specific state of the state machine. The device is particularly useful as a calendaring system.

The state machine wirelessly outputs data like text, images, video and/or audio to a separate device or display.

Embodiments of the reminder device could help the disabled, ill and elderly stay focused on tasks and complete desired activities providing them with greater independence. It could also help researchers, entrepreneurs and social workers who are either studying this group, building assistive technologies or caring for these individuals. Specifically, researchers would be able to better understand the group's characteristics and behaviors, entrepreneurs could create products that would ultimately benefit clients, and social workers could manage the group more effectively. To determine how large of an impact reminder systems can make for a group of choice, scholars could garner statistical records. Improvements based on this data could also be made with regards to the creation of a more pragmatic and efficient reminder device. The device would be affordable, is low power, customizable and capable of connecting to the Internet. As a result, our device can benefit millions of people, especially those who are disabled, ill or elderly, around the world by promoting independence and enabling them to lead more productive lives.

DETAILED DESCRIPTION

Figure 1:
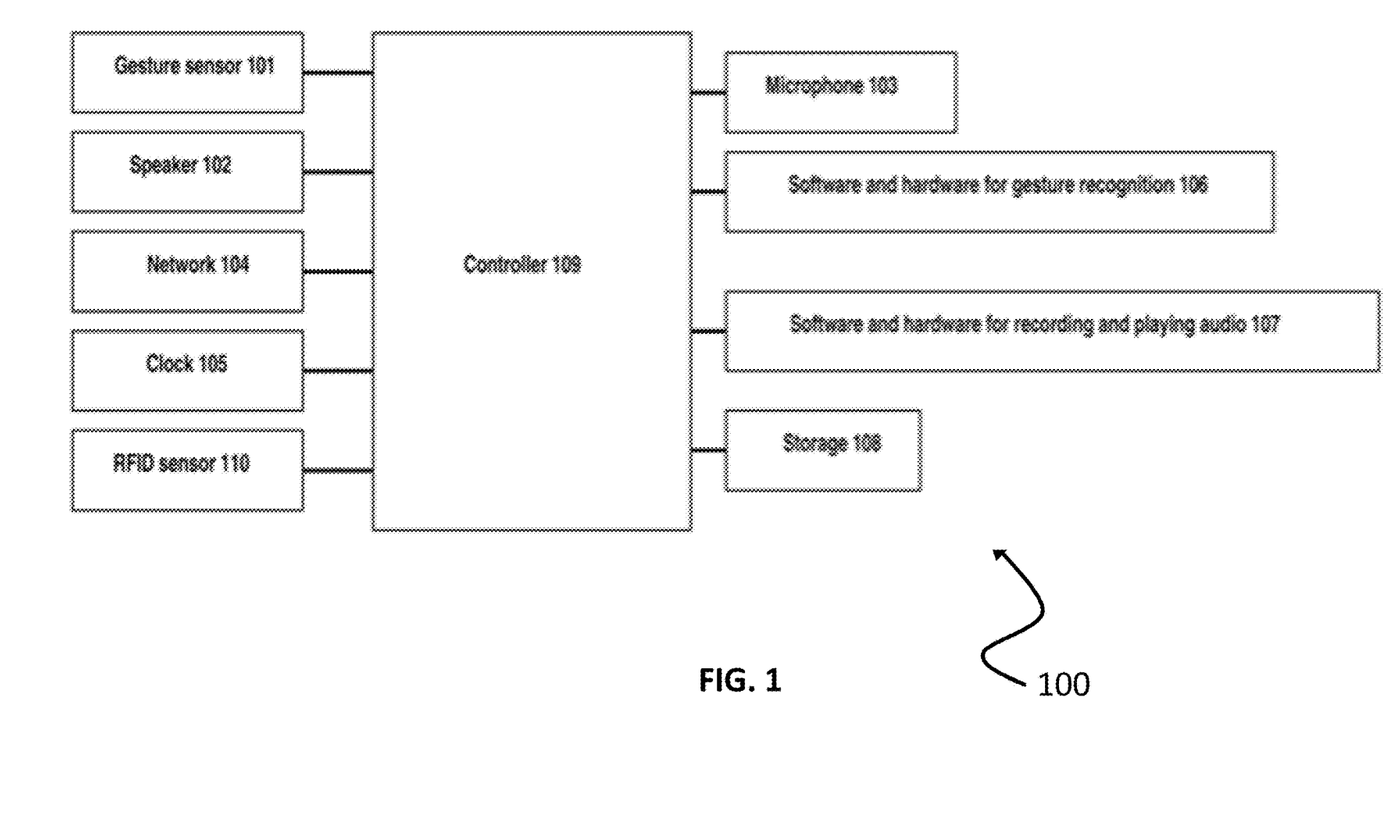
FIG. 1 shows components of the reminder device according to an exemplary embodiment of the invention.

FIG. 1 shows an example of components of reminder device 100. Each component may have hardware, software and/or firmware. The components include: gesture sensor 101, a speaker 102, a microphone 103, a Wi-Fi network interface 104, a clock 105 for providing time-based reminders, software and hardware for recognizing gestures 106, software and hardware for recording and playing audio 107, a storage element 108, and a controller 109.

Figure 6:
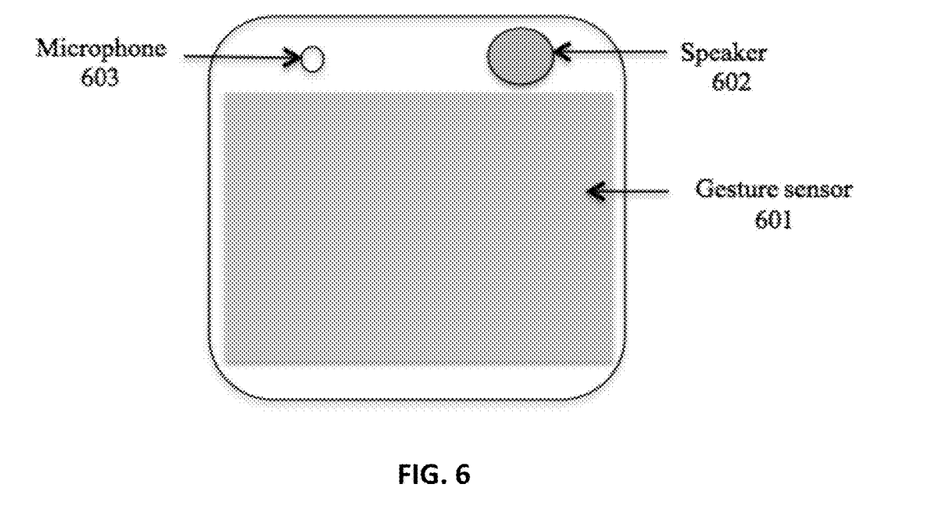
FIG. 6 shows a top-view of the reminder device according to an exemplary embodiment of the invention.
Figure 7:
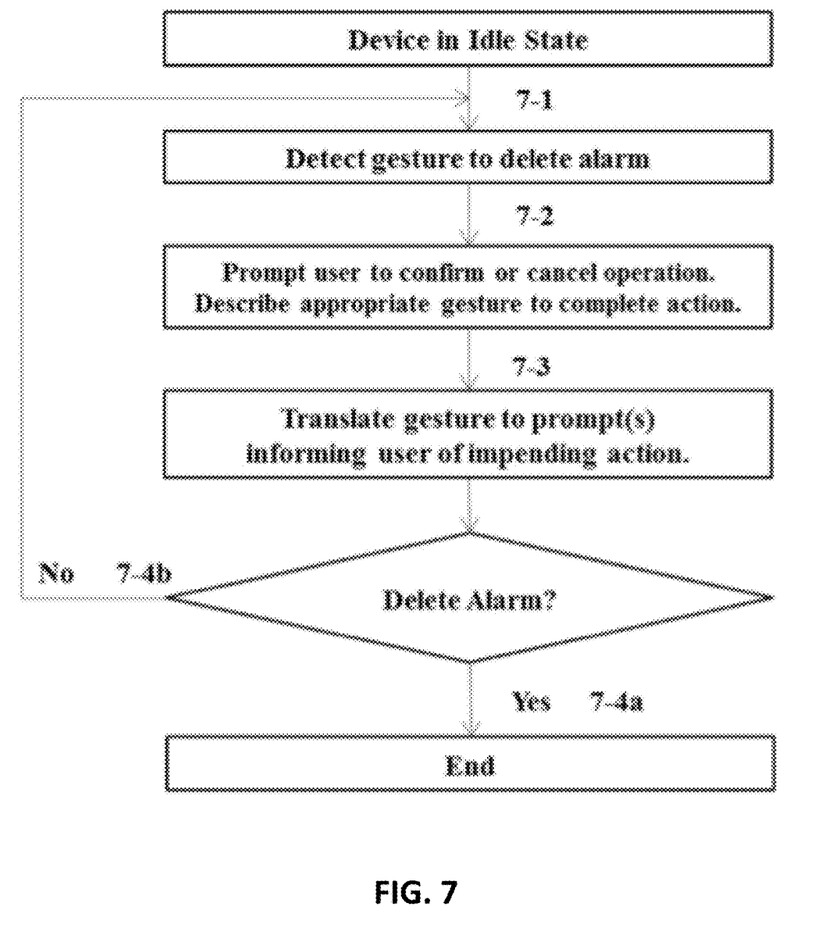
FIG. 7 shows a flow chart describing involving a gesture detected to delete an alarm according to an exemplary embodiment of the invention. The user is prompted to confirm or cancel the operation. The appropriate gestures are described to the user. Translate gestures to prompts informing user of impending action, and delete the alarm if the appropriate gestures is performed. This process is repeated for each alarm.

The gesture sensor 101 is used for detecting a specific set of gestures and is located on the top of the device (FIG. 6). The speaker 102 provides voice prompts to the user, for example, describing the gesture to be performed next to program the device or the current alarm time selected. The microphone 103 is used for inputting voice reminders. The network interface 104 allows the device to connect to a Wi-Fi network so that it can display calendar and alarm information in a mobile device or computer and store compliance information in another machine. The clock 105 is used for providing time-based reminders. When the device is connected to the network, the clock 105 is automatically synchronized with the clock server. The time zone information may be entered in directly through gestures. The device has hardware and software elements for detecting and analyzing gestures 106, such as signal processing elements. In addition, hardware and software elements 107 (such as filters and analog to digital converters) are used for recording audio reminders on device. The storage unit 108 stores voice reminders, voice prompts, and other programs. The RFID sensor 110 can be configured as a receiver to enable an alternate means of creating a calendar schedule. The controller 109 can contain one or more processors and is responsible for interfacing with the sensors and actuators to perform the desired functions.

Figure 2:
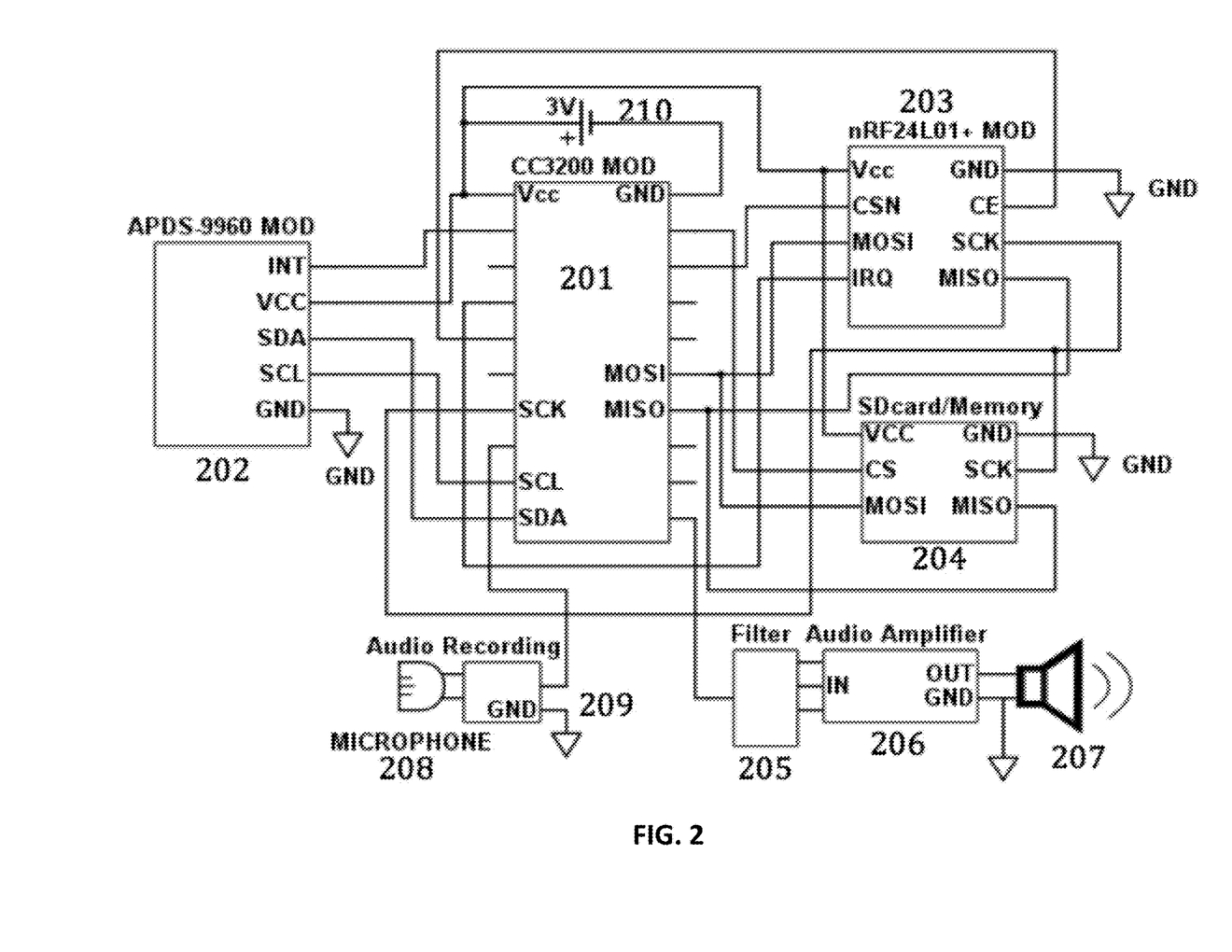
FIG. 2 shows a schematic of a circuit of a processor according to an exemplary embodiment of the invention.

FIG. 2 shows the schematic of the reminder device. It has a microcontroller 201 (CC3200 breakout board) connected to a gesture sensor 202 (APDS-9960 breakout board), an RFID sensor 203 (nRF24L01+ breakout board) and an SD-card or other memory 204. The APDS-9960 is a digital proximity and gesture sensor device with an I$^2$C compatible interface and a detection distance of 100 mm. It has four photodiodes for gesture sensing and can detect several gestures such as UP, DOWN, RIGHT, LEFT, among others. The gesture sensor communicates with the microcontroller through an I$^2$C interface, and its interrupt pin triggers an interrupt on the microcontroller when a gesture is performed. The microcontroller (CC3200) has an integrated Wi-Fi network connectivity. It contains an 80 MHz ARM Cortex-M4 Core, 256 KB of RAM, SPI and I$^2$C interfaces, and several general purpose timers and GPIO pins. In addition, the microcontroller (CC3200) has a real-time clock. The nRF24L01+ is a 2 Mbps ultra-low power RF transceiver for the 2.4 GHz ISM band. When the RFID receiver receives any data, it generates an interrupt on the microcontroller. The RFID sensor and SD-card use the SPI interface to communicate with the microcontroller. Apart from low power consumption, the RFID sensor and gesture sensor have small form factor. There is additional circuitry for recording spoken audio and playing it back. The audio playback is done through a filter 205, audio amplifier 206 and a speaker 207. The audio recording circuit includes a microphone 208, a built-in analog-to-digital converter (ADC), and ADC prescaler 209.

The user can program the device either through the gesture sensor APDS-9960 or by using a mobile device (such as a digital pen or wand) that transmits motion trajectory information of a traced number or shape to the device for further processing. The gesture sensor can recognize several simple motions such as UP, DOWN, LEFT, NEAR, and FAR. To start recording an alarm, a user can perform a gesture such as FAR. This triggers an interrupt on the microcontroller and it then prompts the user to enter a date for the alarm. Alternately, if the user is using a digital pen, the RFID receiver on the device triggers an interrupt, and the microcontroller stores the motion trajectory information received by the RFID receiver (nRF24L01+) in memory for further analysis and number/character recognition. Otherwise, if the user makes an UP or DOWN gesture on the gesture sensor, the device starts to count up or down, starting from the current date, until the user makes a selection using a FAR gesture when the appropriate date is reached. This process is continued until the user has entered all the parameters (such as date and time) for the alarm. The user is then prompted to start recording the voice memo, and the audio data is stored in the SD-card. To conserve power, peripheral devices such as the amplifier and speaker are turned off when they are not used. The RFID receiver is also placed in deep sleep and is only woken up when there is data to be received.

Figure 3:
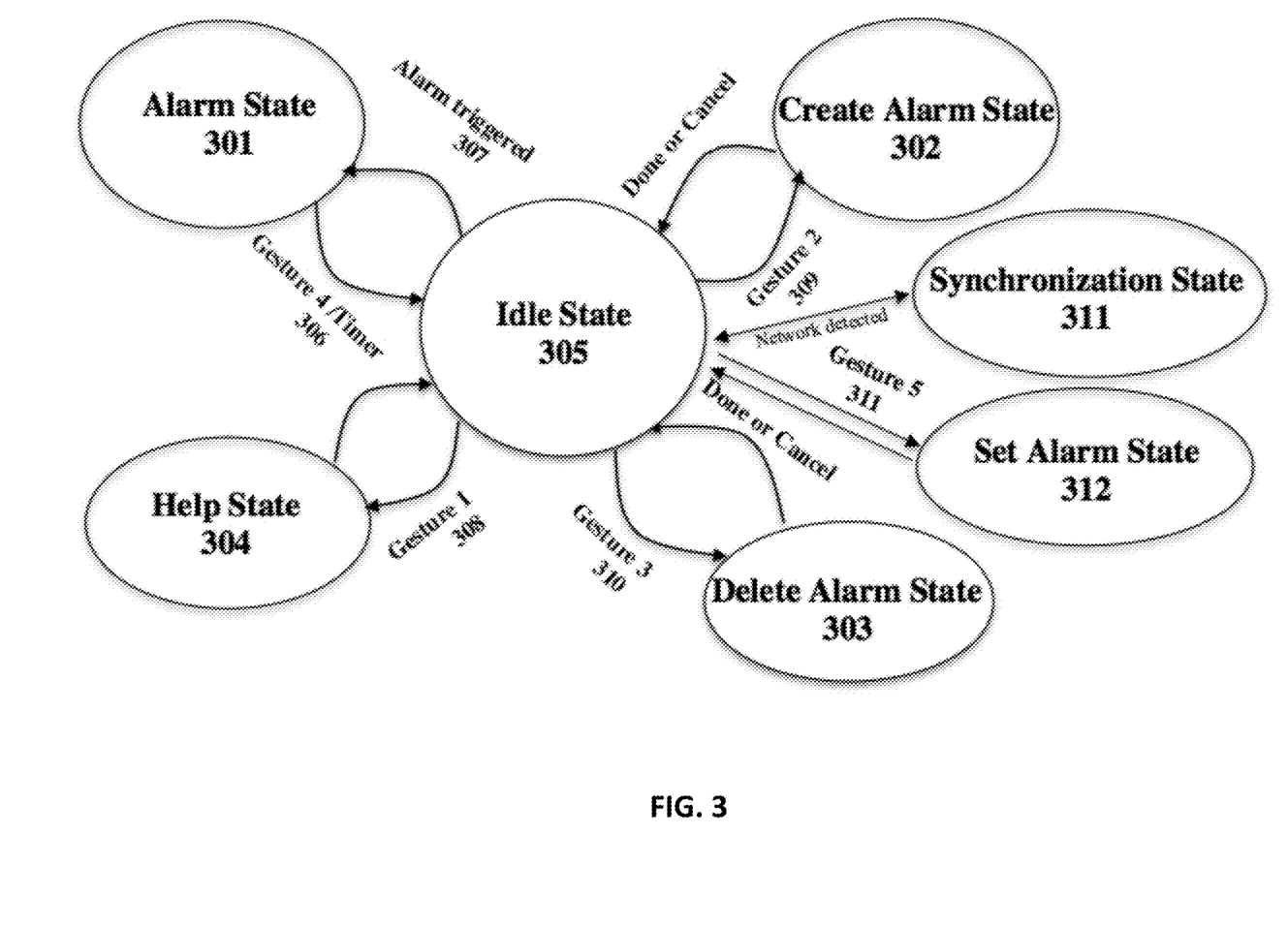
FIG. 3 shows a state machine according to an exemplary embodiment of the invention with transitions between alarm and non-alarm states. When gesture 311 is performed, the machine transitions to the Set time state. In this state, the user can program the current date and time using either the gesture sensor or the digital pen. The mode of programming the time is similar to that shown in the flowchart of FIG. 4 for setting an Alarm, except no audio reminder is recorded.

FIG. 3 shows the state machine of the reminder device. The device is initially in an Idle State 305 during which it consumes very power. When an alarm is triggered internally, the device goes into an Alarm State 301. In this state, the device plays the audio reminder for the corresponding time to the user. The reminder is turned off and device returns back to the Idle State 305 when the user indicates compliance through a gesture or a predetermined time period has elapsed 306. In the Alarm State 301, the device provides a voice reminder of the gesture used to turn off the reminder. A simple gesture 308 can transition the device into the Help State 304 in which the device outputs voice prompts describing the gestures needed for creating or deleting an alarm and synchronizing the device. When a gesture 309 is performed, the device moves into the Create Alarm state 302, and the gesture 310 transitions it into the Delete Alarm state 303. The device returns back to the Idle State 305 when the desired operation is completed or canceled by the user. When the device detects a network, mobile device or computer, it can perform a clock synchronization operation and/or display its preset alarms on the other devices by moving into a synchronization state 311.

Figure 4:
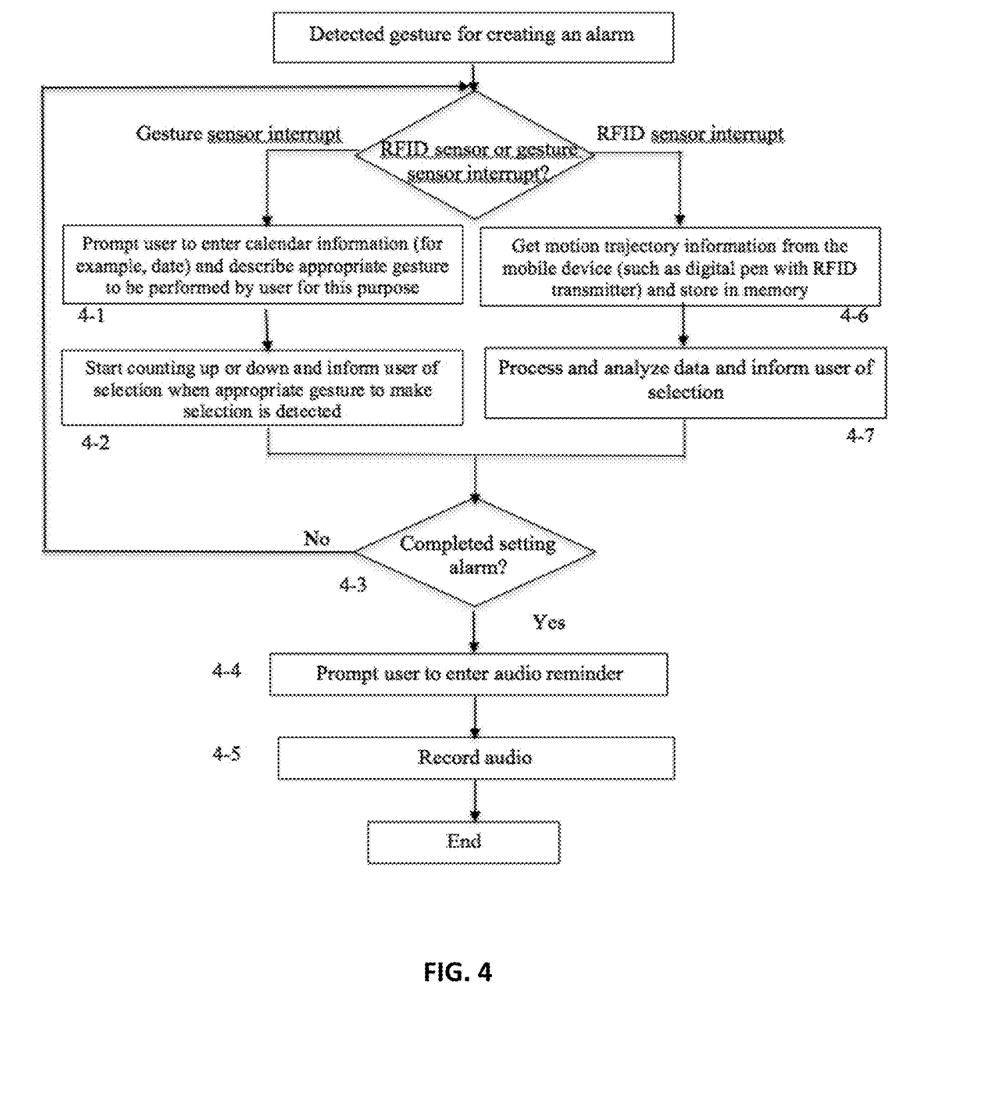
FIG. 4 shows a flow chart for recording a new reminder using the device and according to an exemplary embodiment of the invention.

FIG. 4 shows the flowchart of the device for recording a reminder when the device is in the Create Alarm state 302. The device prompts the user to set some information for when the alarm is to be set 4-1. For example, the device could produce the voice output "Set the date for the alarm" when the user performs the gesture "FAR". If the gesture sensor is triggered, the device then produces a sequence of voice prompts informing the user of the selection 4-2. For example, if the current date is the 10$^{th}$, the device produces a sequence of audio prompts counting up from 10 when the user performs a second gesture "UP". If a "DOWN" gesture is detected, the audio prompts count in reverse. When the user performs the gesture "FAR", the counting stops and the user is informed of the selection "You have selected 12". The duration or frequency of the gestures can be used to control the frequency of the audio prompts. Alternately, the user may trace a number in the air using a digital pen, and the latter transmits information via an RFID transmitter to the device. When the RFID sensor on the device is triggered, it stores the trajectory motion information in the memory of the device 4-6. This data is processed and analyzed, and the number traced by the user is recognized 4-7. The process to store the alarm time and other information pertinent to the alarm is continued 4-3. After the user has completed entering alarm parameters, the device prompts the user to record the voice memo 4-4 and records it 4-5. The device may optionally include a security check before the user can program it. It may also detect if another reminder was scheduled for the same time, inform the user and take appropriate action desired by the user.

Figure 5:
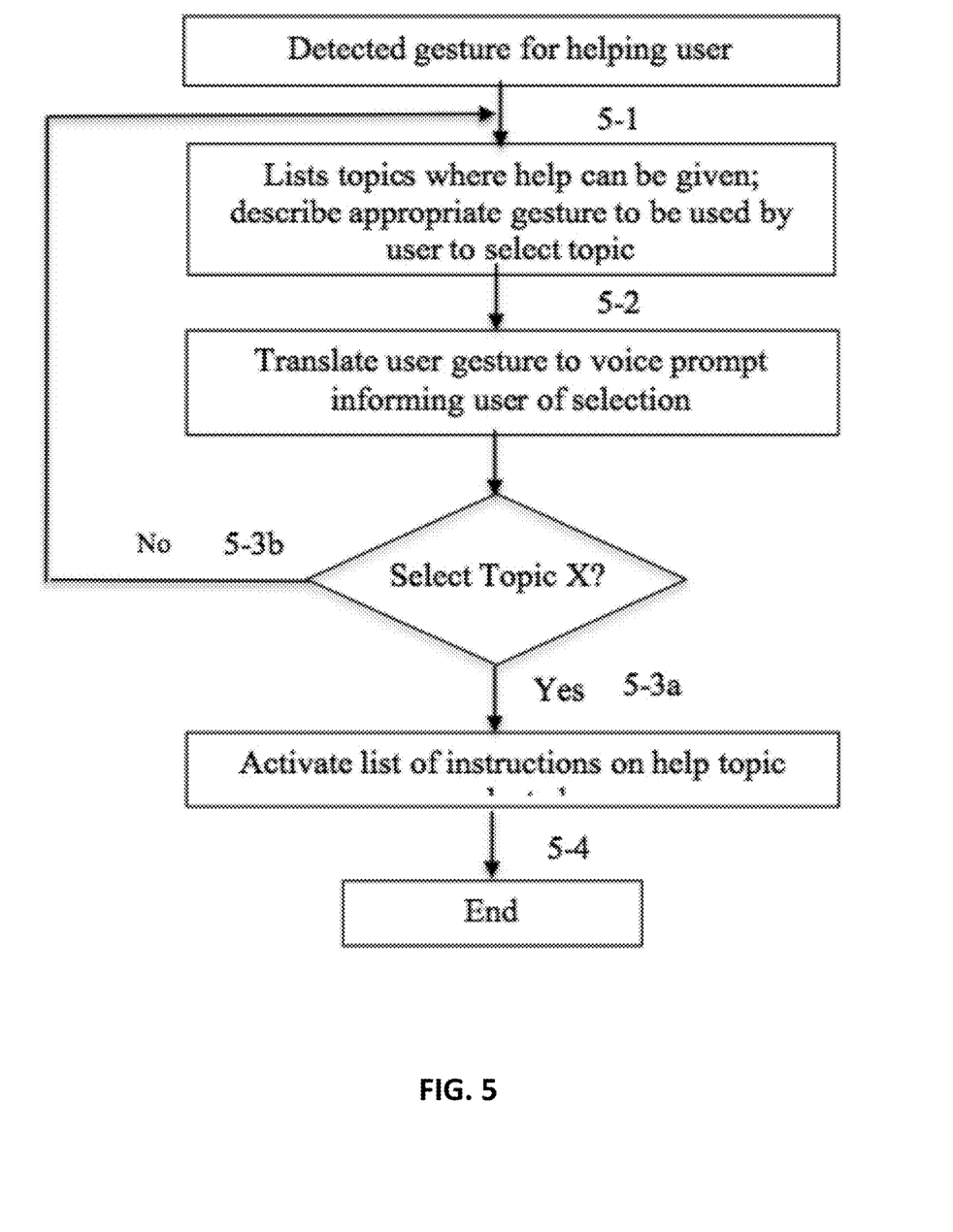
FIG. 5 shows a flow chart describing how a user can get help according to an exemplary embodiment of the invention.

FIG. 5 depicts a flowchart on how the user can obtain assistance with regards to device operation. In 5-1, the user performs a device-recognizable "HELP" gesture (for example, "NEAR"). The device then lists topics in areas where help can be given, such as how to set or delete an alarm (5-2). In this step, the device also indicates the appropriate gesture ("NEAR") to be performed to select the "HELP" topic of choice. Once the user has completed the gesture, the device confirms the user's selection through a prompt (i.e. "Select Topic X?"). If the correct topic has been selected, the user performs the "NEAR" gesture again, and the device proceeds to activate a list of instructions on the HELP topic (5-3a). If the device does not detect the aforementioned gesture within the first five seconds after the prompt delivery, the device returns to the "HELP MENU," in which it lists topics in areas where help can be given (5-3b). Finally, after step 5-3a has been executed, the device returns to its Idle State, as seen in 503 of FIG. 3.

FIG. 6 shows one possible top view of the device with an array of sensors 601, a microphone 603 and a speaker 602.

Embodiments of the invention could be varied or complemented by:
- Using data mining techniques to create future reminders (prediction).
- Using GPS to obtain location information (geographical coordinates) of the user.
- Using real time updates on a user's mobile phone or computer.
- Reminding pet caregivers when it is time to give their pet a meal.
- Integrating with a smart home to remind the people of every day tasks such as locking doors and turning off the stove and other appliances.
- Integrating with mobile devices to provide real-time updates to the user on the phone.
- Wirelessly outputting video data from the reminder device to a separate (remote) device or display.

Embodiments of the invention can be structurally enabled as one or more chips or processors in a wearable device (e.g. at the wrist, hip or where the user prefers) executing computer programs, methods or code defining the state machine, the sensory recognition and detection, the output data and/or the objective/goals defined for the wearable device. The embodiments could be envisioned as devices, methods, systems, computer programs and/or products.

What is claimed is:

1. A reminder system wearable by a user, comprising:
    (a) a reminder device comprising a first gesture sensor for contactless detecting a first type of gestures, the first gesture sensor comprises one or more photodiodes for recognizing gestures made by the user's hand,
    wherein the reminder device does not have a keypad, display or speech recognition; and
    wherein the reminder device does not have inertial sensors;
    (b) an external and separate sensing device with a second gesture sensor for detecting a second type of gestures, and the reminder device wirelessly receiving data from the external and separate sensing device and recognizing a second type of gestures made by the user using the external and separate sensing device;
    (c) a gesture recognition module executable by a processor on the reminder device, the gesture recognition module receiving the sensor data for the first and second types of gestures, wherein the gesture recognition module is programmed to recognize:
- (i) among the first type of gestures, at least three distinct sets of hand gestures with each distinct set of hand gestures having defined at least two distinct type of hand motions, and
- (ii) among the second type of gestures, letters and numbers; and (d) a state machine executable by a processor on the reminder device having a plurality of states programmed to receive the recognized gestures by the gesture recognition module, wherein the state machine changes state based on the recognized gestures, and wherein the state machine depending on it's current state outputs audio reminder data to the user (j) as a result of the user's first and second type of gestures or (jj) as a result of a specific state of the state machine.

2. The system as set forth in claim 1, wherein the plurality of states are related to a calendar system operated on the reminder device, or related to settings or programming of the reminder device in terms of user data or reminder device settings.

3. The system as set forth in claim 1, wherein the state machine wirelessly outputs data to a separate device or display.

* * * * *